United States Patent [19]

Iwamoto et al.

[11] Patent Number: 5,474,153
[45] Date of Patent: Dec. 12, 1995

[54] HYDRAULIC SYSTEM FOR SERVING FOOD

[76] Inventors: Yukio Iwamoto; Masako Iwamoto, both of 1 James Ave., Atherton, Calif. 94027

[21] Appl. No.: 149,687

[22] Filed: Nov. 9, 1993

[51] Int. Cl.⁶ .................................................. B65G 53/02
[52] U.S. Cl. ............................... 186/49; 114/219; 104/73
[58] Field of Search ........................ 186/49, 38; 104/73, 104/59; 273/140; 472/13; 114/219

[56] References Cited

U.S. PATENT DOCUMENTS

| | | | |
|---|---|---|---|
| 597,838 | 1/1889 | Castle | 104/73 |
| 740,206 | 9/1803 | Voris | 104/73 |
| 1,219,692 | 3/1917 | Beltrami | 114/219 |
| 1,245,069 | 10/1917 | Vaidik | 114/219 |
| 1,859,267 | 5/1932 | Kurz | 104/73 |
| 2,604,055 | 7/1952 | Snowden | 104/73 |
| 3,581,700 | 6/1971 | Storch | 114/219 |
| 3,807,806 | 4/1974 | Takahashi | 104/73 X |
| 3,854,415 | 12/1974 | Lamberet | 104/73 X |
| 3,865,041 | 1/1975 | Bacon | 104/73 |
| 4,429,867 | 2/1984 | Barber | 104/73 X |
| 4,619,191 | 10/1986 | Dumas et al. | 104/73 |
| 4,840,253 | 6/1989 | DiMaggio et al. | 186/49 |

*Primary Examiner*—F. J. Bartuska
*Attorney, Agent, or Firm*—Townsend and Townsend and Crew

[57] ABSTRACT

An apparatus for serving and displaying food including a continuous watercourse. Patrons sit around a periphery of the watercourse and food carriers circulate in the watercourse and carry various types of food. The food carriers are structurally independent from one another so that each food carriers is independently removable from the said watercourse. The food carriers also have a bumper sized to maintain a predetermined spacing between the food carriers in the watercourse.

4 Claims, 2 Drawing Sheets

HYDRAULIC SYSTEM FOR SERVING FOOD

BACKGROUND OF THE INVENTION

The present invention relates to the field of food delivery and service devices. More specifically, the present invention relates to a method and apparatus for continuously serving and displaying food.

The concept of displaying food along a circular path of travel before a group of patrons has enjoyed success in Japanese restaurants which serve sushi. In the traditional method of serving sushi the patrons sit in front of the sushi chef and order sushi. A single sushi order is quite small and a single meal generally comprises a number of individual orders which requires a number of interactions between the patron and the sushi chef. The large number of transactions between the sushi chef and each patron limits the number of patrons a sushi chef can serve. Furthermore, making sushi is a relatively involved process. Thus, in the traditional method of serving sushi the patron can wait quite a long time before being served.

With the introduction of automatic food display and service systems a sushi chef can serve a greater number of patrons while providing fresh sushi to the patron as soon as the patron is seated. One such food display system is disclosed in U.S. Pat. No. 4,450,032 to Imanaka. Imanaka discloses a continuous chain of small food carriers having the shape of boats arranged in a watercourse. The bow of each boat is physically attached to the stern of an adjacent boat via a chain or other interconnecting member. Food orders are placed on the boats which are circulated around the watercourse via a water current. Patrons seated around the watercourse remove the food orders from the boats as they pass by. A wide variety of sushi is placed on the boats for presentation to the patrons. The chef monitors and replenishes empty boats with the appropriate variety of sushi. In this manner the sushi chef can serve a greater number of patrons while continually presenting a wide variety of sushi to the patrons.

As can be appreciated, the device of Imanaka suffers from the disadvantage that the boats are connected together. Thus, removal of a single boat for repair or any other reason requires that the boat be severed from the continuous chain. Such a removal requires disabling the entire system. Disabling the system is obviously troublesome since the sushi cannot be served to the patrons during this time.

A further problem with Imanaka occurs when the watercourse must be cleaned. When preparing and serving sushi very sterile conditions are required due to the nature of the food. The food delivery system of Imanaka requires that each boat be disconnected from the line or, alternatively, all boats be removed at once to clean the watercourse. Either procedure can be quite time consuming.

SUMMARY OF THE INVENTION

The food service and delivery system of the present invention includes food carriers which are structurally independent from one another so that each food carrier is independently removable from the watercourse for repair or any other reason.

The food carriers include a bumper sized to maintain a predetermined spacing between the food carriers in the watercourse. The predetermined spacing gives the patron adequate time to select sushi from adjacent food carriers and also gives the sushi chef adequate time to add sushi to adjacent food carriers. The bumper also prevents the carriers from contacting one another to minimize wear and tear on the carriers.

The bumper is preferably a wire which is substantially positioned below a free surface of the water in the watercourse so that the bumper does not ruin the aesthetic appeal of the boats in the waterway. The carrier is preferably in the form of a boat having a bow and a stern. Both ends of the wire are preferably connected to the bow of the boat to form a closed loop.

The bumper also preferably has a width which is substantially equal to the width of the watercourse so that the boat maintains alignment with the waterway. In this manner, the bumper minimizes contact between the food carrier and the watercourse wall.

Other features and advantages of the invention will appear from the following description in which the preferred embodiments have been set forth in detail in conjunction with the accompanying drawings.

DESCRIPTION OF THE PREFERRED EMBODIMENT

Figure 1:
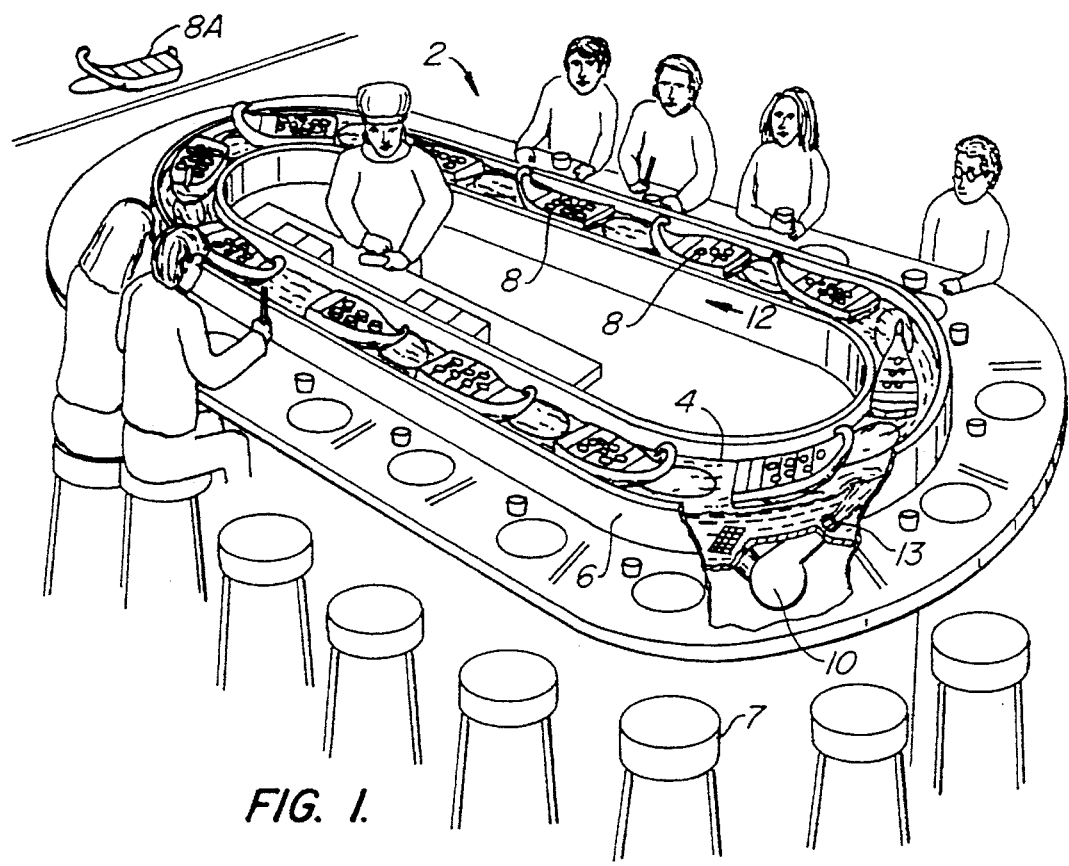
FIG. 1 shows a food display and service system including a watercourse and a number of individual, unconnected food carriers.

A food display and delivery system 2 is shown in FIG. 1. A continuous watercourse 4 has an outer periphery 6 about which seats 7 are positioned for seating patrons. A number of food carriers 8 in the form of boats float on the watercourse 4. A pump 10 induces a current in the watercourse in the direction of arrow 12. The inlet 11 and outlet 13 of the pump 10 are fluidly coupled to the water in the watercourse 4 and are configured to induce the current.

The patrons observe the food carriers 8 as they float by and select the various foods presented on them. After the food on a food carrier has been removed, a food preparer adds an appropriate type of food depending upon the current variety available on the other food carriers. The food carriers may optionally include an indication of what type of food the food carrier carries so that the preparer does not have to monitor all of the food carriers. The indicators help the food preparer maintain a wide variety of the food.

The food carriers 8 are unconnected and, therefore, can be removed individually from the watercourse 4. Thus, an individual food carrier 8 may be removed for repair without interrupting the circulation of the other food carriers. A stand-by food carrier 8A may be added to the watercourse 4 to replace the removed food carrier. The unconnected food carriers 8 also facilitate cleaning of the watercourse since the food carriers can be removed quickly without having to disconnect the food carriers 8 from one another or without having to remove all of the food carriers 8 at the same time.

The unconnected food carriers also advantageously permit quick adjustment of the number of food carriers in the watercourse 4 at a given time. When sushi is served, for example, it is desired to provide a fresh product. Thus, it is undesirable to have the same food on the food carrier for an extended period of time. In order to turn the food over in a short period of time, the number of food carriers in the watercourse can be increased or decreased depending on the number of patrons. Thus, when a great number of patrons are being served a greater number of food carriers can be introduced into the watercourse. Conversely, when a small number of patrons are being served a lower number of food carriers may be provided.

Figure 2:
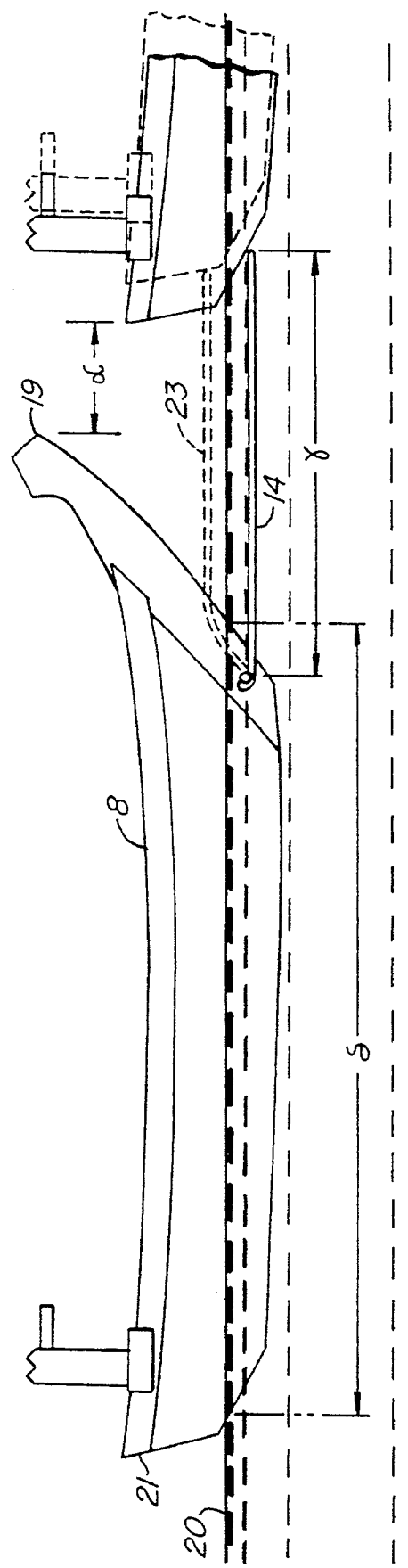
FIG. 2 is a side view of a food carrier in the watercourse.

The food carrier has a bumper 14 which maintains a predetermined minimum spacing α between the food carriers 8 (FIG. 2). The predetermined spacing α gives the patrons time to select food from adjacent food carriers 8 and also gives the food preparer time to add food to adjacent carriers. The bumper 14 also prevents the food carriers from contacting one another.

Figure 3:
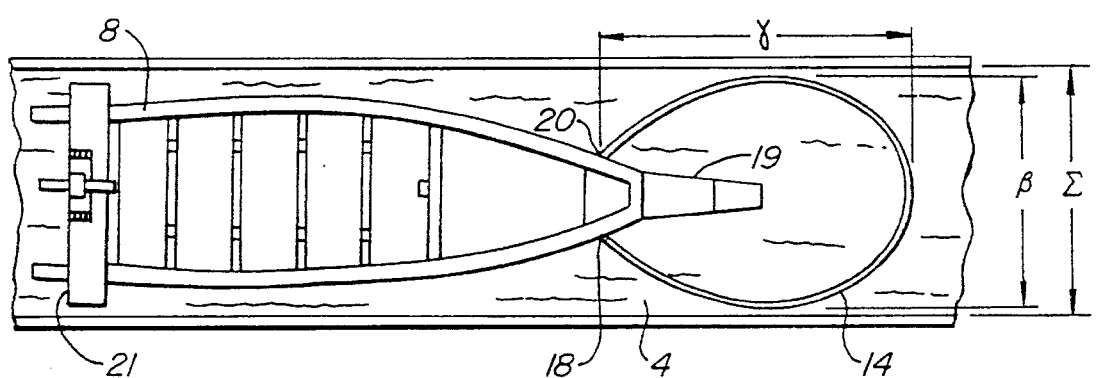
FIG. 3 is a plan view of the food carrier of FIG. 2.

The bumper 14 is preferably a metal wire loop connected to the food carrier at first and second ends 18, 20 to form a closed loop (FIG. 3). When the food carrier is in the form of a boat, it is preferable to connect the bumper to a bow 19 rather than a stern 21 of the boat. The bumper may take many forms, for example, a rigid T-shaped member, or a loop in the shape of a square or triangle. The bumper is designed so as not to distract from the overall aesthetic appeal of the system. The bumper 14 is also preferably substantially positioned below a free surface 20 of the watercourse. By positioning the bumper below the free surface the aesthetic appearance of the system is not compromised. The bumper 14 may, of course, also be positioned above the free surface of the watercourse as depicted in broken lines 23 in FIG. 2.

The bumper has a width β which is substantially equal to the width ε of the watercourse 4 so that the bumper 14 helps to keep the food carrier aligned with the watercourse 4. The bumper also minimizes contact between the food carrier and a watercourse wall 26 thereby reducing wear and tear on the food carriers.

The bumper has a relatively long length γ as compared to the overall length of the food carrier. The food carrier has a length of the water line δ as shown in FIG. 2. The length of the bumper γ is preferably at least one quarter the length of the water line δ and most preferably at least one third the length of the water line δ.

Modification and variation can be made to the disclosed embodiments without departing from the subject of the invention as defined by the following claims. For example, the wire bumper may take any form so long as a claimed dimension is satisfied, the wire bumper can be connected to the stern rather than the bow, the predetermined distance formed by the bumpers may vary, and the food carriers may take the form of a raft-like structure rather than a boat.

What is claimed is:

1. An apparatus for serving and displaying food comprising:

a continuous watercourse having a watercourse width and an outer periphery, the continuous watercourse containing water having a free surface;

means for seating patrons along at least a portion of the outer periphery of the continuous watercourse;

means for inducing a current in the continuous watercourse; and a plurality of food carriers floating in the continuous watercourse under the influence of said current, said food carriers being structurally independent from one another so that each food carrier is independently removable from said watercourse, said food carriers each having a wire bumper sized to maintain a predetermined spacing between said food carriers in said watercourse.

2. The apparatus for serving and displaying food of claim 1 wherein:

the wire further comprises a first end and a second end connected to the food carrier, said wire forming a closed loop extending outwardly from said food carrier.

3. The apparatus for serving and displaying food of claim 1 wherein:

the food carrier is in the form of a boat having a stern and a bow; and the first and second ends of the wire are connected to the stern of the boat.

4. The apparatus of claim 1 wherein the wire bumper comprises metal.

* * * * *